United States Patent
Hoffmann et al.

(10) Patent No.: US 7,554,277 B2
(45) Date of Patent: Jun. 30, 2009

(54) CIRCUIT DEVICE FOR INCREASING THE USEABLE MOTOR VOLTAGE IN A LONG STATOR DRIVE AND METHOD FOR OPERATING A MAGNETICALLY LEVITATED VEHICLE PROVIDED WITH SAID TYPE OF CIRCUIT DEVICE

(75) Inventors: Reinhard Hoffmann, Erlangen (DE); Jörg Lehmpfuhl, Erlangen (DE); Volker Schmitt, Erlangen (DE); Wolfgang Spaeth, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 11/666,866

(22) PCT Filed: Oct. 27, 2005

(86) PCT No.: PCT/EP2005/055600
§ 371 (c)(1),
(2), (4) Date: May 3, 2007

(87) PCT Pub. No.: WO2006/048403
PCT Pub. Date: May 11, 2006

(65) Prior Publication Data
US 2007/0262737 A1 Nov. 15, 2007

(30) Foreign Application Priority Data
Nov. 4, 2004 (DE) .................. 10 2004 053 301

(51) Int. Cl.
*H02P 1/00* (2006.01)
(52) U.S. Cl. ................. 318/135; 318/38; 318/254; 310/12; 310/13; 310/14
(58) Field of Classification Search ............. 318/135, 318/38, 254, 111; 310/12, 13, 14
See application file for complete search history.

(56) References Cited

U.S. PATENT DOCUMENTS 5,569,987 A    10/1996   Fischperer (Continued)

FOREIGN PATENT DOCUMENTS

DE    195 05 963 A1    9/1995

(Continued)

OTHER PUBLICATIONS

International Search Report (PCT/ISA/210).

(Continued)

*Primary Examiner*—Bentsu Ro
*Assistant Examiner*—Thai Dinh
(74) *Attorney, Agent, or Firm*—Harness, Dickey & Pierce, P.L.C.

(57) ABSTRACT

A circuit device is disclosed which is used to increase useable motor voltage in a long stator drive. Further, suitable methods for operating a magnetically levitated vehicle provided with the circuit device are also disclosed. In one embodiment of the present invention, the stator section of the long stator drive is connected to the energy supply line on two connection points by way of a first and a second switch. A third switch is located between both connection points arranged on the energy supply line. Both of the stator section connections are connected to the ground potential by way of a fourth and a fifth switch. In one embodiment, in order to accelerate the magnetically levitated vehicle, the first and the second switches are closed and all other switches are opened. The stator section is cross-flown in a direct manner by current in the energy supply line.

4 Claims, 1 Drawing Sheet

U.S. PATENT DOCUMENTS

| | | | | |
|---|---|---|---|---|
| 5,903,121 A | * | 5/1999 | Heine et al. | 318/434 |
| 6,087,790 A | * | 7/2000 | Fischperer | 318/135 |
| 6,094,021 A | * | 7/2000 | Noro et al. | 318/400.29 |
| 6,118,235 A | * | 9/2000 | Redlich | 318/135 |
| 6,411,049 B1 | | 6/2002 | Fischperer | |
| 6,520,279 B2 | * | 2/2003 | Fukumoto et al. | 180/446 |
| 7,173,387 B2 | * | 2/2007 | Fischperer | 318/135 |

FOREIGN PATENT DOCUMENTS

| | | |
|---|---|---|
| DE | 19615596 | 11/1996 |
| DE | 199 22 441 A1 | 11/2000 |

OTHER PUBLICATIONS

German Search Report, filed Mar. 13, 2009.

* cited by examiner

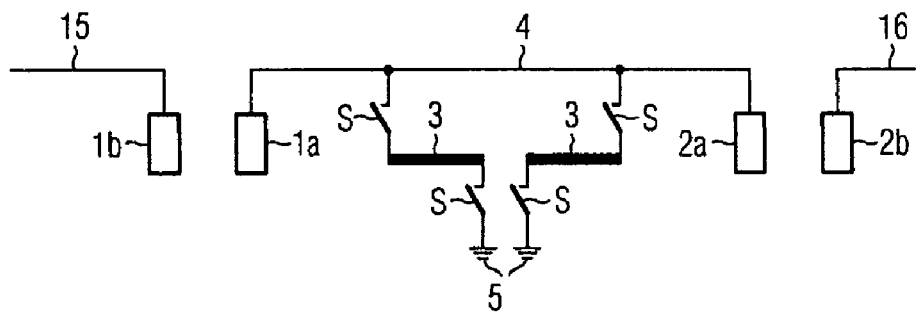
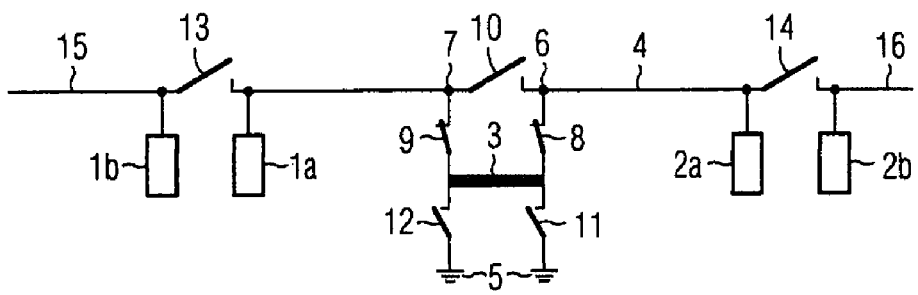
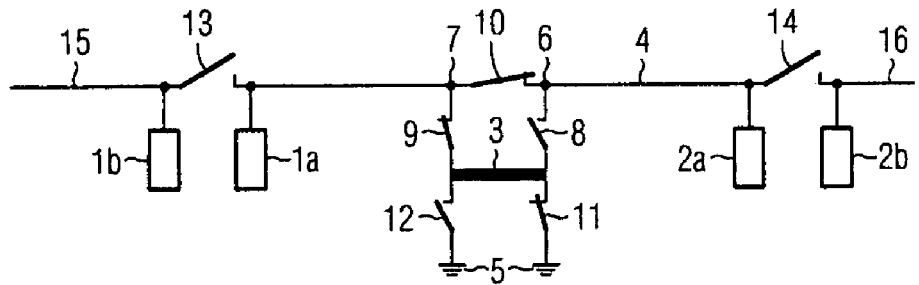

CIRCUIT DEVICE FOR INCREASING THE USEABLE MOTOR VOLTAGE IN A LONG STATOR DRIVE AND METHOD FOR OPERATING A MAGNETICALLY LEVITATED VEHICLE PROVIDED WITH SAID TYPE OF CIRCUIT DEVICE

PRIORITY STATEMENT

This application is the national phase under 35 U.S.C. § 371 of PCT International Application No. PCT/EP2005/055600 which has an International filing date of Oct. 27, 2005, which designated the United States of America and which claims priority on German Patent Application number 10 2004 053 301.6 filed Nov. 4, 2004, the entire contents of which are hereby incorporated herein by reference.

FIELD

Embodiments of the invention generally relate to a circuit apparatus for increasing the usable motor voltage of a long stator drive. For example, it may relate to one with a stator section being connected at its first connection to a power supply line which connects two substations, and connected at its second connection to ground potential.

Embodiments of the invention also generally relate to methods for operation of a magnetic levitation vehicle having a circuit apparatus.

BACKGROUND

DE 196 15 596 A1 discloses an arrangement for feeding power into stator sections of a long stator magnetic railroad system.

Until now, the maximum possible acceleration during starting of a magnetic levitation vehicle which is driven by a linear motor has been limited by the output voltage from the converter, which could be increased only to a restricted extent. Desirable acceleration would necessitate an increase in the output voltage of the converter which would be technically impossible, or at least financially impossible. There are disadvantages particularly in the case of long vehicles, and on long stator sections. Another disadvantage during acceleration is a long distance from the closest substation which ensures the power supply to the stator sections. However, relatively short stator sections and relatively short distances between the substations are not feasible in the station area, because of lack of space. However, this is precisely where the vehicle needs to have particularly high acceleration during starting.

In the past, problems with acceleration during starting of the magnetic levitation vehicle have not occurred since the vehicles were relatively short and the stations were always arranged in the vicinity of the substation, that is to say an electrical power feed point.

Until now, the stator sections have always been connected in parallel with a power supply line, with the first connection of the stator section being connected to the power supply line, and the second connection of the stator section being connected to ground potential. One example is disclosed in DE 196 15 596 A1.

SUMMARY

At least one embodiment of the invention specifies a circuit apparatus by which the useable motor voltage can be increased simply, such that a magnetic levitation vehicle with a long stator drive can be provided with greater acceleration without having to increase the voltage at the output of the converter, or the voltage which is emitted from a substation.

In at least one embodiment, a method is specified for operation of a magnetic levitation vehicle having the circuit apparatus according to the invention.

In at least one embodiment of the invention, the stator section is connected at both of its connections via a first and a second switch to two connecting points on the power supply line, a third switch is arranged in the power supply line between the two connecting points, and the two connections of the stator section are connected to ground potential via a fourth and a fifth switch.

This results, in at least one embodiment, in an advantage that the stator section can be connected in series with the two adjacent substations by suitable operation of the five switches that have been mentioned. This is achieved by closing the first switch and the second switch while the third switch, the fourth switch and the fifth switch are opened. This results in the advantage that, while the output power from the substation to the stator section remains the same, it is possible to apply a voltage which is sufficiently high to allow considerably better acceleration for a magnetic levitation vehicle than the known solution. This is ensured by feeding both adjacent substations to the stator section at the same time.

On the other hand, if required, it is also possible to allow the known circuit arrangement by suitable operation of the five switches. For this purpose, the first switch is closed so that one end of the stator section is connected to the power supply line. The second switch remains open. The fifth switch is closed, so that the other end of the stator section is connected to ground potential. The fourth switch remains open. The third switch, which is located in the power supply line, can be opened. However, it can also be closed, particularly when the closest substation is not ready to operate, in order to pass electrical power to the stator section from the next substation arranged in the opposite direction.

This results in the advantage that, for starting, the stator section can be deliberately connected in series in the power supply line to which two substations are connected. A sufficiently high voltage to allow acceleration that is adequate for the starting of the magnetic levitation vehicle is briefly applied to the stator section. On the other hand, the normal connection of the stator section in parallel with the power supply line can also be implemented for continuous movement, without or with only minor acceleration.

At least one embodiment of the invention allows considerably greater starting acceleration than in the past, particularly for long, and therefore heavy, magnetic levitation vehicles.

In at least one embodiment, a suitable method for operation of a magnetic levitation vehicle with the circuit apparatus is achieved according to the invention in that the first switch and the second switch are closed, and the third switch, the fourth switch and the fifth switch are opened for starting and for movement. This leads to the already mentioned advantage that considerably higher acceleration is possible than in the past.

In at least one embodiment of the invention, a suitable method for operation of a magnetic levitation vehicle having the circuit apparatus is achieved according to one variant in that the third switch is closed and either the first switch and the fifth switch are closed and the second switch and the fourth switch are opened, or the first switch and the fifth switch are opened and the second switch and the fourth switch are closed for movement.

Thus, it is possible to connect the stator section in parallel with the power supply line, in the same way as that which is also known. The two described alternatives in this case selectively allow opposite current-flow directions in the stator section.

Since the third switch is closed, this results in the advantage that not only does this allow an advantageous power supply to the stator section from the energy point of view, which is sufficient to operate the magnetic levitation vehicle in the mean speed range without or with minor acceleration, but, furthermore, if one of the adjacent substations has failed, power can be supplied to the stator section through the closed third switch at any time, via the other, adjacent substation.

The circuit apparatus and the method according to at least one embodiment of the invention advantageously mean that a magnetic levitation vehicle can always be supplied with electrical power in a suitable manner both for starting and when the speed is largely constant during movement, in order on the one hand to allow the vehicle to be operated advantageously from the energy point of view while on the other hand providing sufficiently high acceleration during starting.

BRIEF DESCRIPTION OF THE DRAWINGS

One example embodiment of the circuit apparatus and of the method according to the invention will be explained in more detail with reference to the drawings:

FIG. 1 shows a known circuit apparatus for connection of a stator section to a power supply line, FIG. 2 shows a circuit apparatus for connection of a stator section to a power supply line according to an embodiment of the invention, and FIG. 3 like FIG. 2, shows a circuit apparatus according to an embodiment of the invention, in which the switches are connected for operation of the magnetic levitation vehicle without acceleration, or with only minor acceleration.

DETAILED DESCRIPTION OF THE EXAMPLE EMBODIMENTS

A power supply line 4 is arranged between two adjacent substations 1a, 2a which are used to supply the stator section 3 of a long stator drive.

The circuit apparatus according to the prior art, as is shown in FIG. 1, has switchable stator sections 3 in parallel with the power supply line 4. Each of the stator sections 3 is connected by one connection to the power supply line 4, and by the other connection to ground potential 5. FIG. 1 shows two stator sections 3, which can also be connected to ground potential 5 in star. Depending on the requirement, the stator sections 3 can be disconnected from the power supply line 4 and from ground potential 5 by way of switches S.

In the circuit apparatus according to an embodiment of the invention, as it is illustrated in FIGS. 2 and 3, the stator section 3 is connected to two connecting points 6 and 7 on the power supply line 4. A first switch 8 and a second switch 9 are arranged in the two connecting lines between the two connections of the stator section 3 on the one hand and the connecting points 6, 7 on the other hand. A third switch 10 is located in the power supply line 4, between the two connecting points 6 and 7. The two connections of the stator section 3 are also connected to ground potential 5 via a fourth switch 11 and a fifth switch 12.

As shown in FIG. 2, the first switch 8 and the second switch 9 are closed, and all the other switches are open, for starting or else for high acceleration of a magnetic levitation vehicle.

The intention is that a closed switch represents a conductive connection, while an open switch is a line interruption.

The described circuit apparatus results in the stator section 3 being linked directly into the power supply line 4, from the circuitry point of view. The voltage applied to the stator section 3 is then sufficiently high that sufficiently high acceleration of the magnetic levitation vehicle is possible at any time as well, particularly during starting.

During operation with no acceleration, or with only minor acceleration, as shown in FIG. 3, the second switch 9 and the fourth switch 11 are closed, while the first switch 8 and the fifth switch 12 are open. However, it is also possible for each of the switches to be connected in the respective opposite positions. The third switch 10 is always closed.

This results in a circuit arrangement in which the stator section 3 is connected in parallel with the power supply line 4, and is connected by its second connection to ground potential 5.

Since the third switch 10, which is located between the two connecting points 6, 7 in the power supply line 4, is closed, this ensures that the stator section 3 is always supplied with sufficient electrical power, because it is connected to both adjacent substations 1a and 2a. A defect in one of the two substations 1a or 2a can be compensated for by the other substation 2a or 1a. If one connected substation 1a or 2a were to become defective, the power supply line 4 can be connected to an adjacent power supply line 15, 16 via switching apparatuses 13, 14.

This results in the advantage that the stator section 3 is either suitable for high acceleration of the magnetic levitation vehicle as shown in FIG. 2 or can be connected as shown in FIG. 3, in order to save electrical energy for normal constant-speed travel.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A circuit apparatus for increasing a usable motor voltage of a stator drive, comprising:
    a stator section, connected at a first connection to a power supply line which connects two substations and connected at a second connection to ground potential, the stator section being connected at both of its connections, via a first and a second switch, to two connecting points on the power supply line, a third switch being arranged in the power supply line between the two connecting points, and the two connections of the stator section being connected to ground potential via a fourth and a fifth switch.

2. A method for operation of a magnetic levitation vehicle having a circuit apparatus including a stator section, connected at a first connection to a power supply line which connects two substations and connected at a second connection to ground potential, the stator section being connected at both of its connections, via a first and a second switch, to two connecting points on the power supply line, a third switch being arranged in the power supply line between the two connecting points, and the two connections of the stator section being connected to ground potential via a fourth and a fifth switch, the method, for at least one of for starting and for movement of the magnetic levitation vehicle, comprising:
    closing the first switch and the second switch; and
    opening the third switch, the fourth switch and the fifth switch.

3. A method for operation of a magnetic levitation vehicle having a circuit apparatus including a stator section, connected at a first connection to a power supply line which connects two substations and connected at a second connection to ground potential, the stator section being connected at both of its connections, via a first and a second switch, to two connecting points on the power supply line, a third switch being arranged in the power supply line between the two connecting points, and the two connections of the stator section being connected to ground potential via a fourth and a fifth switch, the method, for at least one of for starting and for movement of the magnetic levitation vehicle, comprising:

closing the third switch; and
    at least one of
        closing either the first switch or the fifth switch; and opening the second switch and the fourth switch, and opening the first switch and the fifth switch and closing the second switch and the fourth switch.

4. A circuit apparatus for increasing usable motor voltage of a stator drive, comprising:

a first and a second switch to connect a stator section to two connecting points on a power supply line which connects two substations, the stator section further being to ground potential;

a third switch, arranged in the power supply line between the two connecting points; and a fourth and a fifth switch to connect the stator section to ground potential.

* * * * *